(No Model.)
G. W. RAYMOND.
DRAFT EQUALIZER.
No. 496,955. Patented May 9, 1893.
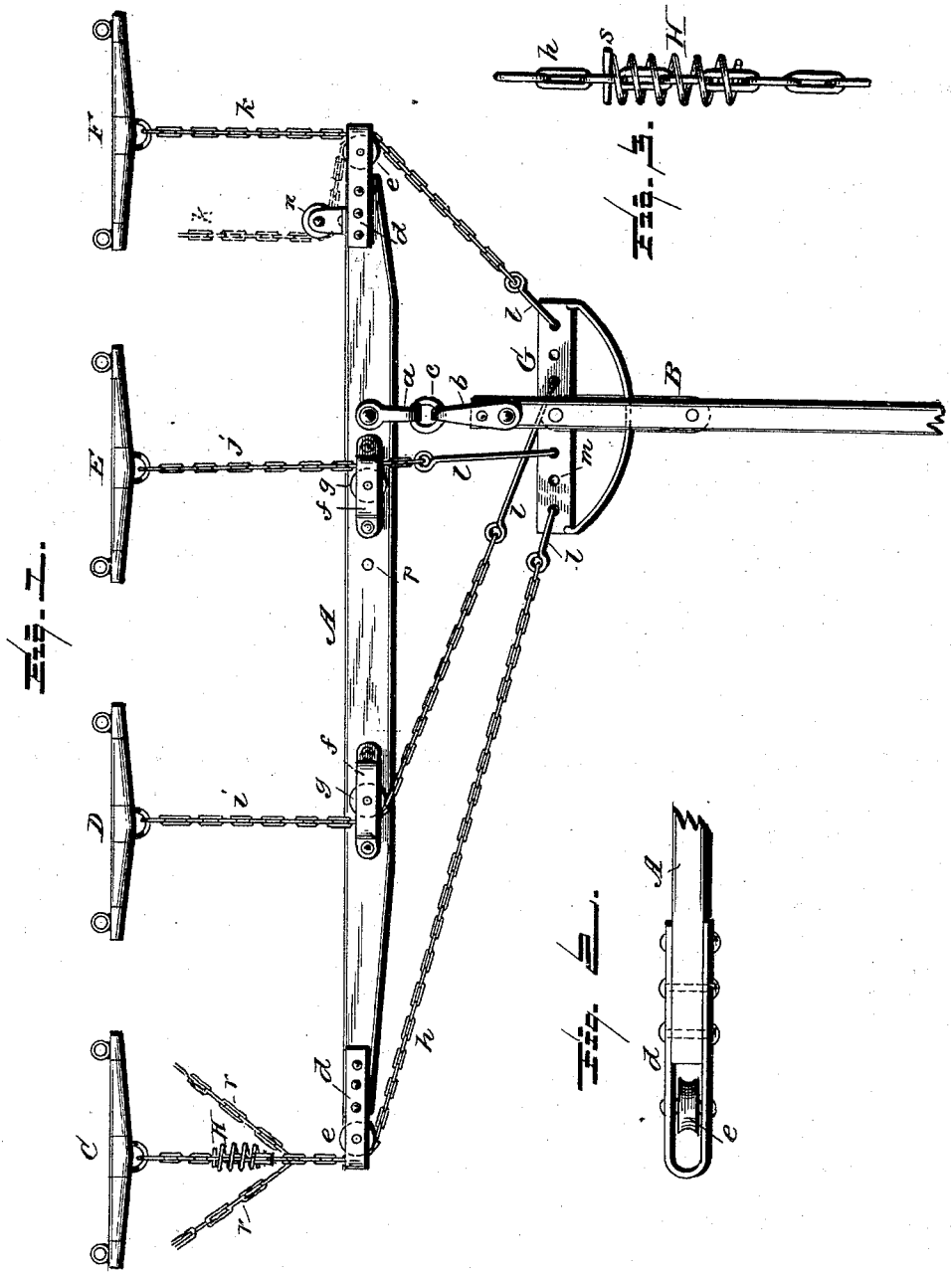
Witnesses:
L. C. Hills
Wm Osgood
Inventor
George W. Raymond.
per Chas. N. Fowler
Attorney
THE NORRIS PETERS CO., PHOTO-LITHO., WASHINGTON, D. C.

UNITED STATES PATENT OFFICE.

GEORGE W. RAYMOND, OF SENECA, ILLINOIS.

DRAFT-EQUALIZER.

SPECIFICATION forming part of Letters Patent No. 496,955, dated May 9, 1893.

Application filed January 18, 1893. Serial No. 458,812. (No model.)

*To all whom it may concern:*

Be it known that I, GEORGE W. RAYMOND, a citizen of the United States, residing at Seneca, in the county of LaSalle and State of Illinois, have invented certain new and useful Improvements in Draft-Equalizers; and I do hereby declare that the following is a full, clear, and exact description of the same, reference being had to the annexed drawings, making a part of this specification, and to the letters of reference marked thereon.

The present invention has for its object to provide a draft equalizer to be used on harvester machines and other wheeled vehicles where such device is found useful, such draft-equalizer possessing durability, being simple in construction, effective in its operation, and equally as well adapted to a five as well as a four horse team.

The several objects I attain by the construction substantially as shown in the drawings and hereinafter described and claimed.

Figure 1 of the drawings represents a plan view of my improved draft-equalizer showing it adapted to a four horse team; Fig. 2 a detail view in perspective showing one end of the draft-bar; Fig. 3 a detail view showing the spring attachment.

In the accompanying drawings A represents a draft-bar to which the tongue B is attached through the medium of a flexible connection, consisting preferably of a link $a$ pivoted to the draft-bar and a link $b$ suitably connected to the rear end of the tongue, and an intermediate ring $c$ connecting the two together.

Upon the end of the draft-bar A are secured suitable plates $d$ to which are journaled grooved pulleys $e$, and upon the upper side of the bar are attached plates $f$ for connecting thereto suitable grooved pulleys $g$, and against these several pulleys work the chains $h\ i\ j\ k$ respectively.

To the forward ends of the chains are connected in any suitable manner the whiffletrees C D E F respectively, which may be of any well known construction, and to the rear ends of said chains are attached hooks $l$ which engage with holes $m$ in a lever-plate G.

In the drawings is shown the equalizer adapted for use in connection with a four horse team, but it can be readily and conveniently changed therefrom to accommodate five horses when found desirable. In order to make provision for this change from a four to a five horse team, the whiffletree C is removed, and to the chain $h$ are connected auxiliary chains $r$ and to the ends of these chains are attached suitable whiffletrees, and between the auxiliary chains may be located a suitable spreader if found desirable.

When employing the auxiliary chains in using the device with team of five horses, a spring actuating device is employed as shown at H Fig. 3, there being two oblique drafts at this end of the draft-bar, and as the side pressure thereof causes a slanting position of the bar, the pin $s$ in connection with the spring actuating device, serves to prevent it, and gives a more flexible motion to the furrow horse when pulling.

The pin or stop $s$ is not considered essential and important and in place of the pin shown any form of stop may be used that will successfully attain the object sought.

The opposite end of the draft-bar A is provided with a supplemental pulley $n$ which is located a short distance from the pulley $e$ and at right angles thereto, and over the pulley passes the chain $k$, said chain having attached the whiffletree F.

When used with a five horse team the chain $k$ extends over or against the supplemental pulley $n$ as shown in dotted lines and two whiffletrees are connected to the auxiliary chains as hereinbefore described.

The hooks $l$ may be changed to any one of the holes $m$ as circumstances require, and when found necessary the lever-plate G is changed to the left of the center, thus giving more purchase or lever power. These changes of the chains and lever-plate with relation to the draft-bar are frequently found necessary where a change of draft is effected by the employment of a less or greater number of horses.

There are many changes or modifications that may be made in the details of construction without affecting the principle of my invention, and I reserve the right to make any such changes as would be considered as coming within ordinary mechanical skill.

Having now fully described my invention, what I claim as new, and desire to secure by Letters Patent, is—

In a draft equalizer, a draft-bar provided with pulleys arranged as shown and a supplemental pulley at right angles to the bar, near one end thereof a lever-plate pivoted to the beam or tongue, chains extending over or against the pulleys and adjustably connected at their rear ends to the lever-plate and at their front ends provided with whiffletrees, and a flexible connection between the draft-bar and tongue, substantially as and for the purpose set forth.

In testimony that I claim the above I have hereunto subscribed my name in the presence of two witnesses.

GEORGE W. RAYMOND.

Witnesses:
 N. E. COLES,
 DANIEL O'CONNELL.